United States Patent [19]
Olson

[11] Patent Number: 4,958,148
[45] Date of Patent: Sep. 18, 1990

[54] CONTRAST ENHANCING TRANSPARENT TOUCH PANEL DEVICE

[75] Inventor: Jan B. Olson, Marina del Rey, Calif.
[73] Assignee: Elmwood Sensors, Inc., Pawtucket, R.I.

[21] Appl. No.: 147,627
[22] Filed: Jan. 22, 1988

Related U.S. Application Data

[63] Continuation of Ser. No. 715,241, Mar. 22, 1985, abandoned.

[51] Int. Cl.[5] .................... G09B 7/00
[52] U.S. Cl. .................... 340/712; 200/5 A; 200/512; 359/255; 350/276 R; 179/18; 341/22
[58] Field of Search .......... 340/365 R, 365 S, 365 C, 340/712, 34, 711, 22; 179/18, 19; 200/5 A, 159 B, 512; 358/245, 252, 253, 255, 247; 296/97 F, 97.1, 97.2, 97.3; 350/276 R; 341/20, 22

[56] References Cited

U.S. PATENT DOCUMENTS

| | | | |
|---|---|---|---|
| 1,488,986 | 4/1924 | Wood | 350/277 |
| 1,571,019 | 1/1926 | Lucas | 296/97 F |
| 2,897,488 | 7/1959 | Rigney et al. | 350/276 R |
| 2,943,964 | 7/1960 | Goldenberg | 350/276 R |
| 3,295,968 | 1/1967 | Hamilton | 350/276 R |
| 3,304,612 | 2/1967 | Proctor et al. | 33/1 M |
| 3,522,664 | 8/1970 | Lambright et al. | 340/825.79 |
| 3,591,718 | 7/1971 | Asano | 178/19 |
| 3,699,439 | 10/1972 | Turner | 324/71.1 |
| 3,708,622 | 1/1973 | Brown et al. | 358/252 |
| 3,760,360 | 9/1973 | Reynolds et al. | 340/365 R |
| 3,798,370 | 3/1974 | Hurst | 178/18 |
| 3,806,912 | 4/1974 | Eckert | 340/347 R |
| 3,894,183 | 7/1975 | Barish | 178/18 |
| 3,911,215 | 10/1975 | Hurst et al. | 178/18 |
| 3,914,548 | 10/1975 | Barish | 178/18 |
| 3,955,190 | 5/1976 | Teraishi | 340/757 |
| 3,959,585 | 5/1976 | Mattes et al. | 178/18 |
| 4,017,848 | 4/1977 | Tannas, Jr. | 340/365 R |
| 4,066,852 | 1/1978 | Zenk | 200/5 A |
| 4,066,853 | 1/1978 | Zenk | 200/5 A |
| 4,066,854 | 1/1978 | Zenk et al. | 200/5 A |
| 4,066,855 | 1/1978 | Zenk | 200/5 A |
| 4,078,257 | 3/1978 | Bagley | 340/365.5 |
| 4,079,194 | 3/1978 | Kley | 178/18 |
| 4,085,302 | 4/1978 | Zenk et al. | 200/5 A |
| 4,149,029 | 4/1979 | Pobgee | 178/18 |
| 4,164,622 | 8/1979 | Pobgee | 178/18 |
| 4,220,815 | 9/1980 | Gibson et al. | 178/18 |
| 4,246,613 | 1/1981 | Choder et al. | 358/255 |
| 4,253,737 | 3/1981 | Thomsen et al. | 350/276 R |
| 4,308,119 | 12/1981 | Russell | 524/40 |
| 4,335,935 | 6/1982 | Pohlack | 350/276 R |
| 4,338,269 | 7/1982 | Russell | 264/22 |
| 4,371,566 | 2/1983 | Russell | 427/53.1 |
| 4,373,007 | 2/1983 | Russell | 428/412 |
| 4,399,192 | 8/1983 | Russell | 428/412 |
| 4,407,855 | 10/1983 | Russell | 427/54.1 |
| 4,412,255 | 10/1983 | Kuhlman et al. | 358/252 |
| 4,442,317 | 4/1984 | Jandrell | 178/18 |
| 4,468,702 | 8/1984 | Jandrell | 358/245 |
| 4,553,818 | 11/1985 | Cohen | 350/276 R |

FOREIGN PATENT DOCUMENTS

| | | | |
|---|---|---|---|
| 2067380 | 7/1981 | United Kingdom | 358/252 |

OTHER PUBLICATIONS

Sierracin/Intrex Products Brochure Entitled, "Touch the Future Thru Transflex".
Sierracin/Transflex Product—"Specification for Flat/-Curved Transflex Switch Overlays".
Sierracin/Transflex Products—"Specification for Formed Transflex Switch Overlays".
Sunflex Brochure Entitled, "Voltfree Anti-Glare, Electrostatic Filters".
Sunflex Ad Entitled, "Now You Can Integrate the Lowest Cost Onscreen OEM Digitizer Available Today".
Panelgraphic Brochure Entitled, "Vueguard TM 901 TM Coating of Plastic Parts and Sheets".

*Primary Examiner*—Alvin Oberley
*Attorney, Agent, or Firm*—Michael B. Farber

[57] ABSTRACT

A contrast enhancing, substantially transparent touch panel device comprises a static element, a dynamic element and a microweave screen of a fine mesh of fine dark-colored filaments embedded within a clear adhesive layer and incorporated as an integral part of the dynamic element of the panel. Preferably there is no air gap between the front of the device and the conductive surface of the dynamic element. The device can comprise at least one layer of transparent colored coating for light attentuation, color-selective light filtering, and tint correction.

60 Claims, 1 Drawing Sheet

CONTRAST ENHANCING TRANSPARENT TOUCH PANEL DEVICE

This application is a continuation, of application Ser. No. 715,241, filed Mar. 22, 1985, now abandoned.

BACKGROUND

The present invention relates to transparent touch panels.

Touch panels are well known. These panels generally comprise two flexible membrane elements, each element either being electrically conductive or being fabricated from a flexible plastic film coated with a thin layer of conductive material. The panels can be flat, or curved such as being formed to fit over a curved surface of a display.

For applications requiring a transparent touch panel, the plastic film can be polyethylene terephthalate film and the conductive material can be a metal such as gold, or a metal oxide such indium tin oxide. The membrane elements are oriented such that the conductive coatings face each other. By selective patterning processes, the two conductive coating surfaces can together form an addressable analog array or a matrix switch array. Operation of the touch panel is initiated by a user forcing the conductive surfaces of the elements into point contact. A matrix type touch panel has a fixed number of selectable discrete row-column coordinates, and the touch point is detected digitally. In the analog version, each element is alternately driven from a power source through a network of opposed busbars, whereby signals are generated which represent the X and Y positions of the touch point. The analog type touch panel has substantially continuous selectable coordinates.

Transparent touch panels can be used for computer data input in combination with a computer display. The touch panel is placed in front of the display. When a program menu is shown on the display, the user can input the appropriate choice by pressing the panel in the area over the correct choice. In this type of application, an advantage of a touch panel is that a large number of control knobs and buttons and switches can be replaced by a single touch panel.

A problem in using displays in outdoor or other high ambient light applications is the contrast problem created by the reflections of the high ambient light competing with the light intensity of the computer display. For this reason, light emitting displays, such as CRTs, plasma displays, or electro-luminescent displays, etc., are usually used in high ambient light applications. However, the contrast problem can still be unacceptable when these displays are used, such as in automobiles where the display can be in bright sunlight.

Contrast ratio is one measure of the readability of a display. It is defined as the ratio of the brightness of the displayed image to the brightness of the background. The human eye can adjust to different light intensities within a reasonable range. Therefore a display can be dim and can still be readable, as long as there is sufficient contrast between the image displayed and the background. The contrast ratio can be improved by either increasing the brightness of the displayed image or by reducing the brightness of the background, or both. A major contributor to the brightness of the background is reflected ambient light. A reduction in the reflection of ambient light will generally improve the contrast ratio and thus readability.

The use of a "grating" of limited thickness such as mini louvres or a mesh, such as the black microweave screen taught in U.S. Pat. No. 4,253,737 to Thomsen et al., placed in front of the display, is quite effective in preventing incident ambient light from causing unwanted reflections. These materials work by virtue of the favorable relationship of the angles of the unwanted ambient light (relatively acute) vs. that of the display-to-user's eye light path (relatively normal to the plane of the display). A large amount of the ambient light is absorbed by the grating while the light emitted by the display is relatively unaffected.

However, the use of dark colored microweave screens is usually precluded when transparent touch panels are used in front of displays, because these microweave screens are susceptible to contamination from dirt, spilled liquids, finger oil, etc., which are inherent in touch panel operation. A dirty microweave screen detracts from the information displayed, and can be objectionable aesthetically. Because of its fine mesh, a dirty microweave screen can be very hard to clean.

In view of these problems, there is a need for a contrast enhancing transparent touch panel that can be used in applications having a high level of ambient light.

SUMMARY

The device of the present invention solves the above problems by incorporating an antiglare or antireflectance microweave screen as an integral part of the dynamic, or pressure actuated element of a transparent touch panel. The microweave screen preferably is impregnated in a transparent adhesive layer, and is further protected by a stain and abrasion resistant front layer of protective material. In order to minimize reflection and enhance contrast, there is preferably no air gap between the front layer of protective material and the conductive surface of the dynamic element. The device can also comprise at least one layer of transparent colored coating material for selective color-filtering, for further increasing the contrast ratio, and for tint correction (color shift).

For efficient contrast enhancement in high ambient light applications, visible light attenuating means such as a colored coating or the microweave screen should be placed between (a) the user and the ambient light source, which are on the same side, and (b) highly reflective surfaces in front of the display. In the case of a transparent touch panel placed before a CRT, the most highly reflective surfaces are the two conductive films of the touch panel. By placing the microweave screen in front of the conductive films, the incoming offending ambient light is attenuated twice (roughly squaring the reduction); while light emitted by the CRT is only attenuated once before reaching the eyes of the user. Therefore contrast ratio is increased even through light transmittance is reduced. By embedding the microweave screen in an adhesive layer, and providing a stain and abrasion resistant front layer, the microweave screen is protected from dirt, finger oil, and inadvertent damage.

Where ambient light reflection is not a problem, the light attenuating means can be located anywhere between the CRT and the user.

The present invention can be used with both analog and matrix type touch panels.

DRAWINGS

These and other features, aspects, and advantages of the present invention will become better understood with reference to the following description, appended claims, and accompanying drawings where:

DESCRIPTION

Figure 1:
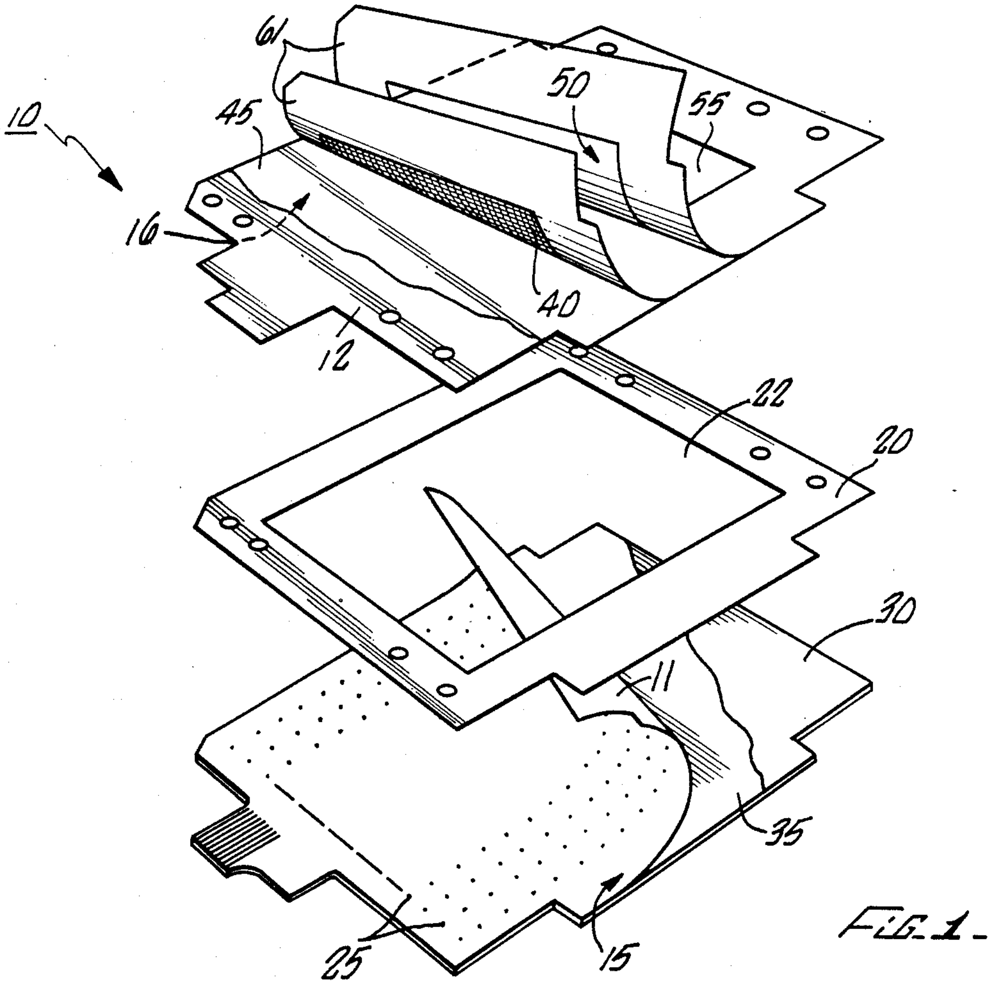
FIG. 1 is an exploded view of a device of the present invention.
Figure 2:
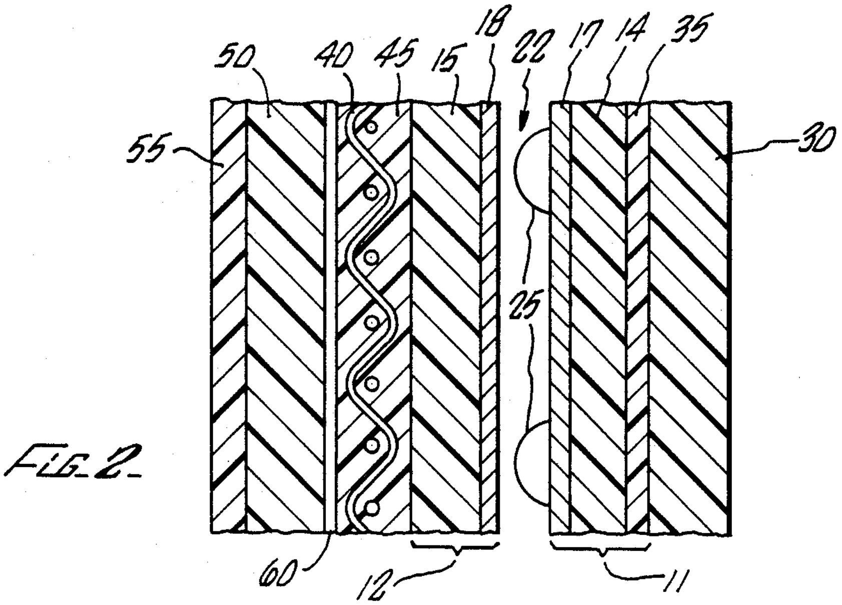
FIG. 2 is a cross-sectional view of the device of FIG. 1.

Referring to FIGS. 1 and 2, a contrast enhancing, substantially transparent touch panel device 10 comprises two transparent, parallel membrane switch elements, namely a static element 11 and a dynamic element 12. The elements can be flat, curved, or formed to fit over the spherical surface of a display such as a CRT. The dynamic element 12 is flexible, the static dynamic element 11 can be flexible. Typically the static 11 and dynamic 12 elements comprise transparent plastic films 14 and 15 and conductive films 17 and 18 respectively. The plastic films can be polyethylene terephthalate films. Each conductive film usually comprises a thin layer of gold, palladium, or indium tin oxide, which is coated on one of the plastic films. Alternatively, one or both of the elements 11 and 12 can be made of a conductive material.

The dynamic 12 and static 11 elements are oriented so that the conductive films 17 and 18 face one another, and are in close proximity. The two elements are spaced apart by a separator 20 about 0.2 mm thick. Separator 20 can be a peripheral frame of finite thickness with an airspace 22 therein. Both sides of the separator 20 have a pressure sensitive adhesive thereon for holding the separator to the plastic films 14 and 15. The adhesive can be a pressure sensitive film adhesive such as that sold under the trade name 3M $_{TM}$-467 by 3M of St. Paul, Minn. Other pressure sensitive adhesives are also suitable. They need not be transparent. The two conductive films are patterned so that together they can form an addressable analog, or matrix switch array. The dynamic element 12 is spaced apart from, parallel to, and in close proximity to the static element 11, and is capable of being selectively displaced so as to contact the static element at selected points on the static element. The static element 11 and the dynamic element 12 can each be about 0.2 mm thick.

The panel device 10 is oriented so that the non-conductive surface of static element 11 faces the computer display (the back) and the non-conducting surface of dynamic element 12 faces the user (the front). The panel device 10 is inoperative until pressure is applied to a point on the non-conductive surface of element 12, the gap being closed at the corresponding contact points of the conductive coatings 17 and 18.

In small touch panels, tension in the plastic films 14 and 15 keeps the conductive films 17 and 18 spaced apart. In large touch panels, preferably there are additional means for keeping the conductive films 17 and 18 properly spaced apart. Preferably the means comprise dispersed small areas of insulation of minimum height, such as dots 25, which prevent contact of the conductive films unless external pressure is applied as described above. The use of the such dots is disclosed in U.S. Pat. Nos. 3,911,215 to Hurst et al. and 4,220,815 to Gibson et al. The dots can have a diameter of about 0.65 mm on about 3.8 mm centers.

A flexible and transparent microweave screen 40 of fine dark-colored filaments in a fine mesh is laminated to the non-conductive side of the dynamic element 12, so as to form an integral part of the dynamic element. To facilitate manufacturing, the microweave screen 40 is preferably laminated between the front (non-conducting) surface of the plastic film 15 of the dynamic element and the back surface of a flexible and transparent third plastic film 50, by means of a flexible and transparent first adhesive layer 45. Preferably the first adhesive layer 45 is formed from a liquid adhesive, which can be cured in situ by well known methods such as UV-cure, elevated temperature cure, room temperature cure, etc. to form the flexible and transparent solid layer 45. Preferably this first adhesive is capable of wetting and impregnating the screen 40 such that there is no air gap between plastic films 15 and 50.

Silicone or polyurethane type adhesives can be used. For example, RTV-615 $_{TM}$ supplied by General Electric Co. of Waterford, N.Y. or similar silicone elastomers can be used. RTV-615 is cured by mixing two components together. The uncured material has a viscosity of about 3500 cps. When used, RTV-615 is clear, has a shore A durometer hardness of about 45, a tensile strength of about 56 kg/cm$^2$, elongation of about 120%, tear strength of about 4.5 kg/cm, a refractive index of about 1.4, and a volume resistivity of about $1\times10^{15}$ ohm-cm. RTV-615 is curable at room temperature. The first adhesive layer 45 can be from about 0.02 mm to about 0.13 mm thick, preferably less than about 0.08 mm thick.

In general, primers are used with silicone adhesives. For example, a silane type primer such as Chemlok $_{TM}$ AP-133 supplied by Lord Chemical Products of Erie, Pa. can be used.

One method to prepare the laminate is to (1) apply the first liquid adhesive to the two plastic films 15 and 50; (2) then sandwich the screen 40 between the two plastic films 15 and 50; (3) then apply pressure on the outside of the sandwich such as by passing the sandwich between rollers or by pressing the sandwich between two plates, so as to impregnate the screen with adhesive and control the thickness of the adhesive layer; and (4) allow the adhesive to cure. Alternatively the adhesive can be dispensed between the layers after the screen 40 is placed between the plastic films 15 and 50.

Preferably the third plastic film 50 is formed of polycarbonate or polyethylene terephthlate. Preferably the front surface of the third plastic film 50 is coated with a protective front layer 55.

The plastic film 50 and the protective front layer 55 can be a precoated plastic film stock. Panelgraphic Corporation of West Caldwell, N.J. supplies plastic film stocks coated with any of a number of coatings selected from a family of proprietary protective surface treatments sold under the trademark Vueguard $_{TM}$ 901 $_{TM}$. Some of the formulations of and methods for applying these coatings are dislosed in U.S. Pat. Nos. 4,308,119; 4,338,269; 4,371,566; 4,373,007; 4,399,192; and 4,407,855, all of which are assigned to Penalgraphic Corporation. Vueguard 901 comes in a water-clear, transparent and smooth-when-cured version, and a low glare version which reduces reflections. The low glare version is preferable for the present invention.

In one version of the invention, plastic film 50 and protective front layer 55 can be eliminated. In this version, preferably, but not necessarily, the first liquid adhesive can cure to form an stain and abrasion resistant layer. Thus the front protective layer 55 is not essential. Polyurethanes such as polyether polyurethanes are known to have good surface durability where cured. Of course any other adhesive which gives good stain and/or abrasion resistance upon curing can be used.

Preferably the laminate is formed with the microweave screen and the first adhesive between the plastic film 15 and a release sheet such as a Teflon$_{TM}$ sheet. The adhesive is then allowed to cure before the release sheet is removed. Yet another alternative is to use a first adhesive which need not be abrasion resistant, and to prepare the laminate without the third plastic film 50, as described above, and then to apply the front protective coating 55 to the cured first adhesive layer.

The touch panel 10 can also comprise at least one layer of transparent, but colored, coating. The color can be a grey tint wherein the coating acts as a neutral density filter. The coating can also have a distinct color, such as amber, green, etc., for color-selective light filtering and/or tint correction. The colored coating layer preferably is in front of the conductive film 18. For example, a colored coating 60 can be applied on to the back surface of the third plastic film 50, or alternatively to the front (non-conducting) surface of the second plastic film 15, before the microweave screen 40 is laminated between the plastic films 15 and 50; colored coating 60 can also be between the protective front layer 55 and plastic film 50.

The colored coating 60 can be formed of a polymeric coating material. Suitable materials include cellulose based resins, acrylics, vinyls, styrenes, epoxies, or combinations thereof. The coating material can be applied by well known methods such as by the use of a proper solvent. The coating can be cured by conventional methods such as air-dry, thermal cure or UV radiation cure. An example of the suitable material is a colorless ink material sold under the trademark Rage+800$_{TM}$, which is supplied by the Advanced Process Supply Co. of Chicago, Ill. It is diluted with Cellusolve$_{TM}$ acetate, and then cured by air-drying. Another example of a material suitable for forming the colored coating layer 60 is a thermally cured mixture of the following: (1) acrylic copolymer resins, such as Carboset$^{R}$ XL-27 Resins sold by B.F. Goodrich Company of Cleveland, Ohio, (2) epoxy resins such as EPONR Resin 825, (4.4-isopropylidenediphenol epichlorohydrin resin) sold by Shell Chemical Co., and (3) an alkyleneamine type hardener, such as RF-14 from Resin Formulators of Culver City, Calif. The resulting coating is substantially clear. This coating can be from about 0.02 to about 0.08 mm thick. Dyes of appropriate colors can be added to give the desired filtering effect and tint correction (color shift). Organic dyes which are commonly available can be used. The amount of light filtering can be controlled by varying the density of the dye particles in the coating. More than one layer of colored coating can also be used. They can be one over the other or can be located separately. Also, the colored coating can be incorporated as part of the protective front layer 55, or adhesive layer 45, by adding the dye to the coating material for the front layer 55 or the first liquid adhesive before they are applied.

The device 10 as described up to this point can be mounted directly onto the surface of the CRT. Alternatively, the device 10 can be independent of and spaced apart from the CRT. In the latter case, for dimensional stability, the static element 11 can be laminated to a transparent plastic backing 30, by means of a second adhesive layer 35.

The backing 30 can be formed of an acrylic material such as Plexiglas$_{TM}$ about 1.5 mm thick. The second adhesive layer 35 can be a pressure sensitive film type adhesive, which is optically clear and transparent. Suitable adhesives include MACBond$_{TM}$ IP-2100, which comprises an optically clear carrier coated with optically clear adhesives, supplied by Morgan Adhesives of Stow, Ohio; and 3 M$_{TM}$ Y9721, an optically clear acrylic adhesive transfer tape recommended for high surface energy substrates, supplied by 3M of St. Paul, Minn. The adhesive film is placed between the non-conducting surface of static element 11 and the backing 30, and then pressure is applied to form the laminate and to eliminate air bubbles.

Alternatively, a second liquid adhesive is used. Preferably the second adhesive cures to form a transparent solid layer. Preferably well known methods for curing, such as elevated temperature cure, room temperature cure, or UV radiation cure can be used. One method to prepare the laminate is to apply the second liquid adhesive between the non-conducting surface of static element 11 and the backing 30, then apply pressure so as to eliminate air and force the static element and the backing into intimate contact. Next the second liquid adhesive is allowed to cure. The second liquid adhesive can be a polyurethane, epoxy, acrylic, or vinyl adhesive. Silicone type adhesives are generally unsuitable as they do not wet acrylics well.

The second adhesive layer can be from about 0.02 to about 0.13 mm thick.

When ambient light reflections are not a big problem, the light attenuating means such as the microweave screen 40 and the colored coating 60 can be on either side of the touch panel (elements between and including films 14 and 15.)

The peripheral areas 61 of the static 11 and dynamic 12 elements can have patterned electrically conductive regions such as busbars.

The touch panel device 10 can be non-rectangular. Further, it can be planar, or can be curved or formed to fit over a curved or spherical CRT screen.

The touch panel device 10 can be very thin and flexible having a thickness of from about 0.5 to about 1.5 mm without the backing 30, or about 2 to about 3 mm with the optional backing 30.

To a user sitting in front of the touch panel device 10 of this invention when it is placed in front of a CRT, there are many surfaces reflecting the ambient light and diminishing contrast. They include the glass surface of the CRT, and all the surfaces of the different layers of the device 10 at their interfaces. The greater the difference in the indices of refraction for two materials, the greater the amount of light reflected. For example, for light at normal incidence travelling through air, $$R=(n-1/n+1)^2$$

where,

R = the ratio of the reflected light to the incident light, n = the index of refraction for the reflecting surface. Thus as n increases, the amount of light reflected greatly increases.

Metals and metal oxides such as indium tin oxide can have an index of refraction over 12 vs. that of about 1.5 for plastics and glass and 1 for air. Therefore the most problematic areas for reflection are the interface between the metal or metal oxide conductive film 17 and the air space 22; and between the conductive film 18 and the plastic film 15. Where ambient light causes contrast problems, for any antiglare or antireflectance device to be most effective, it should be incorporated between these highly reflective layers and the source of ambient light. The reason is that ambient light must pass through the antiglare layer twice: once going in, and once coming out when reflected, to reach the eyes of the user. In contrast, light emitted by the CRT has to pass through the antiglare device only once. There is an exponential relationship between the amount of light reduction and the number of attenuating passes. For a simplified example, say before an antiglare device is added, the display brightness is 2A and the background brightness (including reflection of ambient light) is A, the contrast ratio is 2. If a light attenuating device which gives 80% light transmittance is added between the display and the ambient light source, the display brightness is reduced to $(2A)(80\%)=1.6$ A, and the background brightness is reduced to $(A)(80\%)^2=0.64A$. The contrast ratio is therefore increased to 2.5. Even though the light emitted by the CRT is reduced by 20%, the contrast ratio was increased by 25%.

Accordingly, the present invention incorporates a microweave screen of dark-colored filaments between (a) the user and the ambient light source, and (b) the highly reflective layers described above. The microweave screen 40 is embedded completely within the adhesive layer 45, and there are no air gaps from the front surface of the device 10 to the front surface of the conductive film 18. Elimination of the air gaps reduces reflection of ambient light.

By incorporating the microweave screen as an integral part of the dynamic element, there is no separation of layers which give an unpleasant "floppy" feel to the user. An integrated dynamic element (everything between and including front layer 55 to conductive film 18) gives positive tactile feedback when pressed. Moreover, since the microweave screen 40 is embedded completely in the first adhesive layer 45, it is protected from being damaged inadvertently. The abrasion and stain resistant front layer 55 gives further physical protection to the microweave screen.

The colored coating 60 can enhance contrast. For example it can act as a neutral density filter for attenuating light indiscriminate of wavelength if a grey tinted coating is used. It works by providing double-pass attenuation of the ambient light as described above. It assists the microweave mesh 40 in screening out unwanted ambient light, especially where the ambient light is substantially normal to the plane of the microweave screen 40, in which case screen 40 is less effective. If the coating 60 has a color similar to that of the light emitted by the CRT display, the coating 60 enhances contrast by minimizing the passage of light therethrough except for the light which is of the same color as that emitted by the CRT. That is, the colored coating acts as a band-pass filter or notch filter. For example, if a green-light emitting CRT is used, a green-tinted coating layer 60 can be used. This green coating layer acts as a color-selective filter for all light except that similar in wavelength to the light emitted by the CRT display. The colored coating layer can also be used for correcting the tint or cause a shift in the color of the light emitted by the CRT.

Another advantage of the touch panel device of this invention over merely placing the microweave screen in front of the touch panel is that the rough surface of the microweave screen is replaced by the relatively smooth surface of outer layer 55. The outer layer 55 does not trap dust and finger oil like the mesh of the screen 40. Moreover, the outer layer 55 can easily be cleaned.

Thus the present invention provides a touch panel having an abrasion resistant antiglare surface, that can also be used for applications having high ambient light levels.

Although the discussion above refer mainly to CRT's, the present invention is equally applicable to be used with all displays, including both non-light emitting displays such as LCD's, and light emitting displays such as plasma displays, or electro-luminescent displays, etc.

Where ambient light is not a problem, the major source of unwanted light interfering with contrast comes from the phosphor effect on the display. To solve this problem, there is no preferred location for placing light attenuating means such as a colored coating or a microweave screen, as long as the means are placed between the display and the eyes of the user. Therefore, in applications where ambient light reflections are not a problem, the light attenuating means can be located anywhere on either side of the touch panel (everything between and including plastic films 14 and 15).

Although the present invention has been described in considerable detail with reference to certain preferred versions thereof, other versions are possible. For example, the microweave screen 40 can be peripherally mounted and adhesive layer 45 can be eliminated. Also more than one microweave screen layer can be used. Therefore, the spirit and scope of the appended claims are not limited to the description of the preferred versions contained herein.

What is claimed is:

1. A contrast enhancing, substantially transparent touch panel device comprising:

(a) a transparent touch panel comprising:

(i) a first transparent, electrically conductive layer;

(ii) a flexible second transparent electrically conductive layer facing, spaced apart from, parallel to, and in close proximity to the first conductive layer, the second conductive layer being selectively displaceable so as to contact the first conductive layer at selected points;

(b) a front transparent, flexible, protective layer; and (c) an antiglare layer held in place by and embedded within a flexible and transparent adhesive, the adhesive being in liquid form when applied and having been cured in situ, the antiglare layer comprising a flexible and transparent fine mesh microweave screen formed of fine dark-colored filaments.

2. The device of claim 1 wherein the antiglare layer is between the front protective layer and the second conductive layer.

3. The device of claim 2 in which the first conductive layer comprises a first transparent plastic film coated with a first transparent film of electrically conductive material and the second conductive layer comprises a flexible second transparent plastic film coated with a flexible second transparent film of electrically conductive material, wherein the two films of electrically conductive material face each other.

4. The device of claim 3 in which the microweave screen is embedded within the adhesive so that there is no air gap between the antiglare layer and the second film, and between the antiglare layer and the front protective layer.

5. The device of claim 1 wherein the front layer is stain and abrasion resistant.

6. The device of claim 1 wherein the adhesive is a silicone elastomer.

7. The device of claim 2 further comprising a flexible transparent plastic film between the front protective layer and the plastic antiglare layer, the protective layer being on the plastic film.

8. The device of claim 1 further comprising at least one transparent colored coating.

9. The device of claim 8 wherein the coating has a grey tint for light attenuation.

10. The device of claim 8 wherein the coating is tinted for color selective light filtering.

11. The device of claim 8 wherein the colored coating is between the front layer and the second conductive layer.

12. The device of claim 1 in which the front layer is colored for light filtering.

13. The device of claim 1 in which the adhesive is colored for light filtering.

14. The device of claim 1 comprising more than one antiglare layer.

15. The device of claim 3 in which the adhesive is the front protective layer.

16. The device of claim 15 wherein there is no air gap between the antiglare layer and the second film.

17. A device as claimed in claim 1 wherein the adhesive forms a layer on both sides of the microweave screen.

18. A device as claimed in claim 1 wherein the adhesive is cured at about room temperature.

19. A contrast enhancing, substantially transparent touch panel device comprising from back to front:

(a) a transparent touch panel comprising:
  (i) a static element comprising a first transparent plastic film coated with a first transparent film of electrically conductive material on its front surface,
  (ii) a dynamic element comprising a flexible second transparent plastic film coated with a flexible second second transparent film of electrically conductive material on its back surface, the second conductive film facing, spaced apart from, parallel to, and in close proximity to the first conductive film, the dynamic element being selectively displaceable so that the second conductive film can contact the first conductive film at selected points;

(b) a first antiglare layer comprising a flexible and transparent microweave screen embedded within a flexible and transparent layer of an adhesive, the adhesive having been in liquid form when applied and having been cured in situ to form a solid layer, the adhesive holding the microweave screen to the dynamic element, the screen being a fine mesh formed of fine dark-colored filaments; and (c) a flexible and transparent front layer of protective material, the front layer being stain and abrasion resistant;

there being no air gap between the front layer and the dynamic element.

20. The device of claim 19 further comprising at least one transparent colored coating for light filtering, said colored coating being between the front layer and the static element.

21. The device of claim 19 wherein the front layer is colored for light filtering.

22. The device of claim 19 wherein the adhesive is colored for light filtering.

23. The device of claim 19 further comprising a flexible and transparent third plastic film between the front layer and the adhesive layer.

24. The device of claim 19 in which the adhesive is the front layer of protective material.

25. A device as claimed in claim 19 wherein the adhesive forms a layer on both sides of the microweave screen.

26. A contrast enhancing, substantially transparent touch panel device comprising:

(a) a transparent touch panel comprising:
  (i) a first transparent, electrically conductive layer;
  (ii) a flexible second transparent electrically conductive layer facing, spaced apart from parallel to, and in close proximity to the first conductive layer, the second conductive layer being selectively displaceable so as to contact the first conductive layer at selected points;

(b) an antiglare layer held in place by and embedded within a flexible and transparent adhesive, the adhesive being in liquid form when applied and having been cured in situ, the antiglare layer comprising a flexible and transparent fine mesh microweave screen formed of fine dark-colored filaments.

27. The device of claim 26 wherein the adhesive cures in situ to form a stain and abrasion resistant layer.

28. The device of claim 26 wherein the second conductive layer is between the antiglare layer and the first conductive layer.

29. The device of claim 26 further comprising at least one transparent colored coating for light filtering.

30. The device of claim 26 wherein the adhesive is colored for light filtering.

31. The device of claim 28 wherein the adhesive cures to form a stain and abrasion resistant layer.

32. The device of claim 28 further comprising a stain and abrasion resistant, transparent and flexible front protective layer.

33. The device of claim 28 wherein there is no air gap between the antiglare layer and the second conductive layer.

34. A device as claimed in claim 26 wherein the adhesive forms a layer on both sides of the microweave screen.

35. A method for manufacturing a contrast enhanced substantially transparent touch panel device comprising the steps of:

(a) selecting:
  (i) a transparent first plastic film;
  (ii) a flexible and transparent second plastic film;
  (iii) a flexible and transparent third plastic film;
  (iv) a first electrically conductive material;
  (v) a second electrically conductive material;
  (vi) a flexible and transparent microweave screen of a fine mesh of fine dark-colored filaments;
  (vii) a clear liquid adhesive capable of curing in situ to form a flexible transparent solid layer;
  (viii) a transparent abrasion and stain resistant coating material;

(b) assembling the touch panel device by the steps of:

(i) forming a first transparent film of the first electrically conductive material on the front surface of the first plastic film;

(ii) forming a flexible second transparent film of the second electrically conductive material on the back surface of the second plastic film, the two conductive films being so patterned that together they can form an addressable switch array;

(iii) forming a first laminate by placing the microweave screen between the front surface of the second plastic film and the back surface of the third plastic film with the liquid adhesive therein, applying pressure to the laminate so that there is no air gap between the second and third plastic films and that the screen is embedded within and impregnated with the adhesive, and allowing the adhesive to cure, the first laminate thus formed being flexible;

(iv) applying the abrasion and stain resistant coating material onto the front surface of the third plastic film to form a flexible and transparent front protective layer; and (v) affixing the first and second plastic films to one another, after the conductive films have been formed on them, so that the second conductive film is facing, spaced apart from, parallel to, and in close proximity to the first conductive film, the first laminate being selectively displaceable so that the second conductive film can contact the first conductive film at selected points on the first conductive film.

36. The method of claim 35 further comprising the steps of selecting and applying at least one transparent colored coating for light filtering.

37. The method of claim 35 wherein the adhesive is a silicone elastomer which is cured at room temperature in the first laminate forming step.

38. The method of claim 35 wherein a colored dye is added to the adhesive before it was applied in the first laminate forming step.

39. A method as claim in claim 35 wherein the adhesive is allowed to cure at about room temperature.

40. A method for manufacturing a contrast enhanced substantially transparent touch panel device comprising the steps of:

(a) selecting:

(i) a transparent first plastic film;

(ii) a flexible and transparent second plastic film;

(iii) a first electrically conductive material;

(iv) a second electrically conductive material;

(v) a flexible and transparent microweave screen of a fine mesh of fine dark-colored filaments;

(vi) a clear liquid adhesive capable of curing in situ to form a flexible transparent solid layer;

(vii) a release sheet capable of being released from the adhesive after the adhesive has cured;

(b) assembling the touch panel device by the steps of:

(i) forming a first transparent film of the first electrically conductive material on the front surface of the first plastic film;

(ii) forming a flexible second transparent film of the second electrically conductive material on the back surface of the second plastic film, the two conductive films being so patterned that together they can form an addressable switch array;

(iii) forming a first laminate by placing the microweave screen between the front surface of the second plastic film and the release sheet with the liquid adhesive therein, applying pressure to the laminate so that there is no air gap between the second plastic film and the release sheet, and so that the screen is embedded within and impregnated with the adhesive, allowing the adhesive to cure, and then releasing the release sheet from the cured adhesive, the first laminate thus formed being flexible;

(iv) affixing the first and second plastic films to one another, after the conductive films have been formed on them, so that the second conductive film is facing, spaced apart from, parallel to, and in close proximity to the first conductive film, the first laminate being selectively displaceable so that the second conductive film can contact the first conductive film at selected points on the first conductive film.

41. The process of claim 40 further comprising the steps of selecting and applying a transparent abrasion and stain resistant coating material on to the front surface of the adhesive after it has cured, to form a flexible and transparent front protective layer.

42. The process of claim 40 wherein the liquid adhesive is capable of curing in situ to form a layer with a stain and abrasion resistant surface.

43. A contrast enhancing substantially transparent touch panel comprising:

(a) a selectively addressable switch array having:

(i) a first electrically conductive means;

(ii) a flexible second electrically conductive means facing, spaced apart from, parallel to, and in close proximity to the first conductive means, the second conductive means being selectively displaceable so as to contact the first conductive means;

(b) an antiglare layer located in front of the second conductive means, said antiglare layer having a contrast enhancement medium whereby ambient light reflected from the conductive means is selectively attenuated by being forced to pass through the contrast enhancement medium at least twice;

(c) holding means for holding the antiglare layer and the switch array in place, said holding means having a layer of adhesive in back of the antiglare layer and bonding the antiglare layer to the second conductive means, the adhesive in liquid form when applied and cured in situ, the adhesive being selected from the group consisting of silicone adhesives and polyurethane adhesives;

(d) a flexible plastic film placed on the outside of the antiglare layer; and (e) a flexible front layer of protective material, the front layer being stain and abrasion resistant, there being no air gap between the front layer and the second conductive layer, whereby the panel is flexibly responsive to tactile activation.

44. The panel of claim 43 wherein the first and second electrically conductive means are separate layers of electrically conductive material.

45. The panel of claim 43 wherein the first electrically conductive mean sis a static element having a first plastic film coated with a first membrane of electrically conductive material on its front surface, and the second electrically conductive means is a dynamic element having a flexible second plastic film coated with a flexible second membrane of electrically conductive material on its back surface.

46. The panel of claim 45 in which the first and second plastic films are polyethylene terephthalate.

47. The panel of claim 45 in which the first and second membranes of electrically conductive material are selected from the group consisting of gold, palladium, and indium tin oxide.

48. The panel of claim 43 in which the contrast enhancement medium is formed of a polymeric coating material.

49. The panel of claim 48 in which the contrast enhancement medium is selected from the group consisting of cellulose based resins, acrylics, vinyls, styrenes, epoxies, and combinations thereof.

50. The panel of claim 48 in which the contrast enhancement medium is a thermally cured mixture of acrylic copolymer resin, epoxy resin, and an alkyleneamine type hardener.

51. The panel of claim 43 in which the flexible plastic film placed on the outside of the antiglare layer is selected from the group consisting of polycarbonate and polyethylene terephthalate.

52. The panel of claim 43 further comprising:

(a) an adhesive layer adjacent to and located behind the first electrically conductive means; and (b) a rigid backing means laminated to the first electrically conductive means by the adhesive layer.

53. The panel of claim 52 in which the rigid backing means is a plastic.

54. The panel of claim 53 in which the plastic is acrylic plastic.

55. The panel of claim 52 in which the adhesive layer is a pressure sensitive adhesive.

56. The panel of claim 52 in which the adhesive layer is a liquid adhesive.

57. The panel of claim 56 in which the liquid adhesive is one selected from the group consisting of polyurethanes, epoxy adhesives, acrylic adhesives, and vinyl adhesives.

58. A contrast enhancing substantially transparent touch panel adapted for use in a motor vehicle instrument panel comprising:

(a) a selectively addressable switch array having:

(i) a static element having a first plastic film of polyester terephthalate coated with an electrically conductive first membrane of indium tin oxide on its front surface;

(ii) a dynamic element having a flexible second plastic film of polyester terephthalate coated with a flexible electrically conductive second membrane of indium tin oxide on its back surface, the dynamic element being selectively displaceable so that the second conductive membrane can contact the first conductive membrane at selected points;

(iii) means for keeping the first and second membranes facing each other, spaced apart, parallel, and in close proximity;

(b) a layer of urethane adhesive adjacent to and located behind the first plastic film;

(c) a rigid backing means of acrylic plastic laminated to the first plastic film by the urethane adhesive layer;

(d) an antiglare layer located in front of the dynamic element, the antiglare layer having a contract enhancement medium whereby ambient light reflected from the conductive membranes is selectively attenuated by being forced to pass through the contrast enhancement medium at least twice;

(e) a layer of silicone adhesive in front of the antiglare layer and bonding the antiglare layer to the dynamic element; and (f) a flexible and transparent front layer of protective material, said layer having a graphic overlay of hardcoated polycarbonate and being stain and abrasion resistant.

59. A method for assembling a contrast enhanced substantially transparent touch panel comprising the steps of:

(a) locating an electrically conductive first membrane on the front surface of a first plastic film by coating the front surface of the film with an electrically conductive material;

(b) locating an electrically conductive second membrane on the back surface of a second plastic film by coating the back surface of the film with electrically conductive material, the two conductive membranes being so patterned as to be able to form a selectively addressable switch array;

(c) placing an antiglare layer having a contrast enhancement medium between the front surface of the second plastic film and the back surface of a third plastic film, so that the contrast enhancement medium is located such that ambient light is selectively attenuated by being forced to pass through the contrast enhancement medium at least twice;

(d) holding the antiglare layer and the second and third plastic film firmly in place with a clear liquid adhesive capable of curing in situ to form a flexible solid layer, the adhesive being selected from the group consisting of silicone adhesives and polyurethane adhesives, so that there is no air gap between the second and third plastic films, a flexible first laminate being formed by placing the antiglare layer between the back surface of the third plastic film and the front surface of the second plastic film with the antiglare layer separated from the front surface of the second plastic film by the liquid adhesive, applying pressure to the laminate so that the antiglare layer is impregnated with the adhesive, and allowing the adhesive to cure;

(e) applying an abrasion and stain resistant coating onto the front surface of the third plastic film to form a flexible front protective layer; and (f) forming a selectively addressable switch array by affixing the first and second plastic films to one another after the conductive membranes have been located thereon so that the second conductive membrane is facing, spaced apart from, parallel to, and in close proximity to the first conductive membrane, the second conductive membrane and structures attached thereto being selectively displaceable so that the second conductive membrane can contact the first conductive membrane at selected points on the first conductive membrane, whereby the switch array is flexibly responsive to tactile activation.

60. The method of claim 59 further comprising the steps of forming a second laminate by placing the back side of the touch panel and a rigid backing means on either side of a second adhesive layer, applying pressure to eliminate air, forcing the back side of the touch panel into intimate contact with the rigid backing means, and allowing the second adhesive layer to cure.

* * * * *